United States Patent [19]

Seer, Jr.

[11] 4,018,988
[45] Apr. 19, 1977

[54] NEGATIVE GAMMA CIRCUIT

[75] Inventor: Harold George Seer, Jr., Woodbury, N.J.

[73] Assignee: RCA Corporation, New York, N.Y.

[22] Filed: Feb. 26, 1976

[21] Appl. No.: 661,616

[30] Foreign Application Priority Data

Aug. 6, 1975  United Kingdom ............ 32842/75

[52] U.S. Cl. ..................... 358/164; 178/DIG. 16; 178/DIG. 28; 358/32
[51] Int. Cl.² ..................... H04N 3/16; H04N 9/53
[58] Field of Search ............ 178/7.1, DIG. 28, 23, 178/24, DIG. 16, 7.2; 358/32, 54

[56] References Cited

UNITED STATES PATENTS

| 3,708,693 | 1/1973 | Ferrier et al. | 178/DIG. 16 |
| 3,970,774 | 7/1976 | Bazin et al. | 178/DIG. 16 X |

Primary Examiner—Robert L. Griffin
Assistant Examiner—Aristotelis M. Psitos
Attorney, Agent, or Firm—Eugene M. Whitacre; Mason DeCamillis

[57] ABSTRACT

A gamma circuit for developing a video output signal having a positive gamma coefficient from an input signal having a negative gamma coefficient includes a multiplier and amplifier which forms an electronic divider. Adjustable reference sources provide a means for varying the gamma of the circuit to correct an input signal gamma of −.35 to −1 to a positive gamma.

4 Claims, 3 Drawing Figures

NEGATIVE GAMMA CIRCUIT

BACKGROUND OF INVENTION

The present invention relates to apparatus for gamma correction of signals generated by a television film camera, and in particular to negative gamma correction of negative film used with a telecine camera.

In a television system, it is necessary to process the video signals before transmission to compensate for certain nonlinearities in the respective transmission and receiving systems to ensure that the viewer sees a picture which is a true reproduction of the televised scene. Among the nonlinearities of the system for which compensation must be made are the gamma characteristics of the television receiver picture tube and the televison camera pickup tube.

Gamma is defined as a numerical indication of the degree of contrast in a television image. Kinescopes used in television receivers generally have a nonlinear characteristic such that the black portions of a video signal are compressed and the white portions of a video signal are stretched. The black to white range, or gray scale, of a monochrome television signal or the luminance portion of a color television signal is represented by amplitude variations of the video signals. Therefore, a video signal varying linearly in amplitude applied to a nonlinear kinescope in a television receiver would result in a picture the contrast range of which would be reduced undesirably according to the nonlinear transfer characteristic of the kinescope. Accordingly, it is desirable to gamma correct the video signal prior to transmission in such a manner that the signal reproduced in a television receiver has the desired contrast range.

Generally, gamma correction is accomplished by passing the video signals derived from the television camera through a nonlinear circuit having a predetermined exponential relationship between input and output to precorrect the signal for the subsequent nonlinear transfer characteristic of the kinescope in the television receiver. While the exponent may be any selected number, it is generally accepted that the nonlinear circuit should provide an output equal to its input raised to reciprocal of the kinescope gamma, typically to the one-half power. The nonlinear circuit is usually located in a video signal processing amplifier coupled between the camera pickup tube and the color encoder. When the image source for the television camera is a positive film such as generally used for television programming, the positive film has a gamma characteristic which may be expressed in video signal form as $V_X = K \cdot B^\gamma$, where K is a constant and B is the scene brightness. For a typical positive color film, gamma will be approximately +2. This gamma value of +2 for a positive film when combined with the signal processing gamma of +0.5, previously described, results in an overall gamma of approximately +1. This combined signal gamma value of +1 is further combined at the television receiver kinescope whose gamma is typically +2. The overall combined gamma from film to signal processing to kinescope yields a gamma value of +1 which is desired in order to accurately reproduce the film images.

Heretofore, it has been customary practice in television programming to utilize positive color film in television film cameras because such positive film is color balanced; that is, equal amounts of red, green and blue colors yield white, thereby permitting direct viewing of the positive film by the camera system. However, the making of positive film from the original negative film requres at least one extra processing step which takes time and results in a degradation or resolution as well as color saturation of the resulting positive film relative to the negative. It would be advantageous to use negative film directly. However, negative film is not color balanced; therefore, a masking operation is utilized for balancing the video output signal from negative film to correspond to the balanced video signals from a positive film. Apparatus suitable for this masking operation is described in detail in co-pending application of Harold G. Seer, Jr. Ser. No. 661,615, assigned to the same assignee and filed concurrently herewith entitled, "Negative Color Mask Correction".

Negative masking operations will provide for the development of balanced video signals when utilizing negative film; however, such masking operations do not correct for the negative gamma characteristic of negative film. As was previously described in conjunction with the transfer characteristic of television systems, known positive gamma circuits readily accommodate a positive film, whereas negative gamma image signal sources cannot be readily accommodated without additional circuitry. Prior art efforts involved inverting the video signal and providing negative curve shaping by means of networks utilizing semiconductors and resistive components in an attempt to develop a video signal with a positive gamma from negative film sources. These typical prior art attempts were only marginally successful in regard to satisfactory curve shaping of the inverted video signal as well as tracking repeatability between the three color channels.

SUMMARY OF THE INVENTION

A gamma circuit for developing a video output signal having a positive gamma coefficient from an input signal having a negative gamma coefficient, comprises an input terminal for receiving a first signal ($V_X$) having a negative gamma coefficient. First combining means coupled to the first signal and to a first reference ($V_B$) for providing a first additive combination ($V_X + V_B$) of the first signal and the first reference signal. Divider means responsive to the first additive combination signal and a second reference source ($V_Z$) for developing an output signal equal to the second reference source divided by the first additive combination signal. Second combining means coupled to the divider output signal and a third reference source (P) for additively combining the divider output signal and the third reference source.

DESCRIPTION OF THE INVENTION

Figure 1:
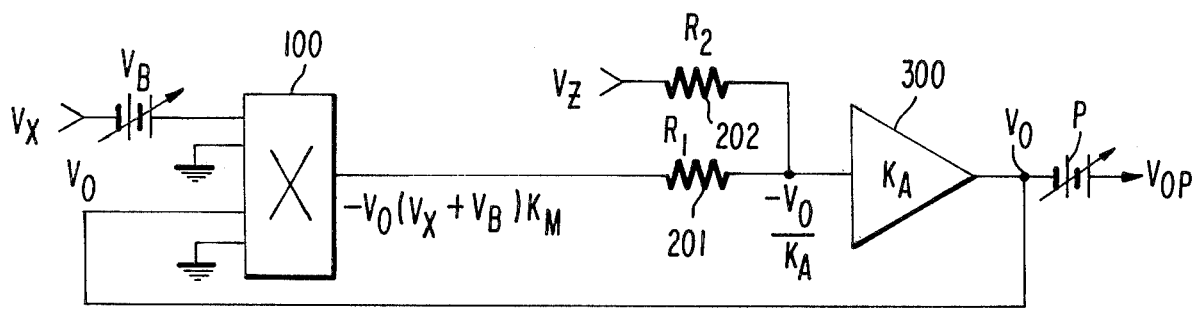
FIG. 1 is a block diagram of a negative gamma circuit embodying the present invention.

In FIG. 1, an input video signal $V_X$ is additively combined with a voltage source $V_B$ and the additive combination of $V_X + V_B$ is coupled to one input terminal of the differential input terminals of a four-quadrant multiplier 100. The output terminal of multiplier 100 is coupled to one terminal of a voltage divider comprising resistors 201, 202. A voltage source $V_Z$ is coupled to the other terminal of resistors 201, 202. The common junction of resistors 201, 202 is coupled to the input terminal of an amplifier 300. The output signal $V_O$ of amplifier 300 is coupled to a second input terminal of multiplier 100 and also additively combined with a voltage source P. As illustrated, multiplier 100, which is connected in the feedback loop of operational amplifier 300, forms an electronic divider in a known manner; i.e., the output signal $V_O$ equals the signal $V_Z$ divided by $(V_X + V_B)$.

The signal transfer characteristic of the circuit of FIG. 1 may be expressed as:

$$\frac{-V_O}{K_A} = \frac{-V_O(V_X + V_B)K_M R_2}{R_1 + R_2} + \frac{V_Z R_1}{R_1 + R_2} \tag{1}$$

where:
 $K_A$ = amplifier gain
 $K_M$ = multiplier constant
 $V_X$ = signal input
 $V_Z$ = divider constant
 $V_O$ = signal output
and:
 $V_{OP} = V_O + P$
where:
 P = D.C. Pedestal
therefore:

$$V_O = \frac{V_Z R_1 K_A}{(V_X + V_B)K_M R_2 K_A - (R_1 + R_2)} \tag{2}$$

and:

$$V_O = \frac{V_Z \left(\frac{R_1}{R_1 + R_2}\right)}{(V_X + V_B)K_M \left(\frac{R_2}{R_1 + R_2}\right) - \frac{1}{K_A}} \tag{3}$$

and:

$$V_{OP} = \frac{V_Z \left(\frac{R_1}{R_1 + R_2}\right)}{(V_X + V_B)K_M \left(\frac{R_2}{R_1 + R_2}\right) - \frac{1}{K_A}} + P \tag{4}$$

If the gain of amplifier 300 approaches infinity and voltage sources $V_B$ and P are made zero, the circuit of FIG. 1 would form a perfect divider circuit. Equation 4, which defines the transfer characteristic of the circuit of FIG. 1 under these conditions, becomes:

$$V_{OP} = \frac{V_Z R_1}{V_X K_M R_2} \tag{5}$$

where $R_1$, $R_2$ and $K_M$ are constants, or:

$$V_{OP} = K \frac{V_Z}{V_X} \tag{6}$$

and:

$$V_{OP} = K V_Z (V_X)^{-1} \tag{7}$$

wherein $V_Z$ can be adjusted to control the output level $V_O$.

The contrast or density of a negative film which determines the gamma characteristic may be expressed mathematically as:

$$\text{Density} = \frac{1}{\text{Light Transmission Of Film}} \tag{8}$$

and the light transmission of the film is:

$$\frac{1}{C \cdot B^\gamma} \tag{9}$$

where C is a constant and B is the scene brightness which may be further expressed as:

$$\frac{1}{C} \cdot B^{(-\gamma)} \tag{10}$$

Since the video signal from an image pickup tube is directly proportional to the amount of light passed by the film and imaged onto a photosensitive electrode of the pickup tube, the output signal from the image pickup tube is:

$$V_{Video} = K \cdot B^{(-\gamma)} \tag{11}$$

or:

$$V_X = K \cdot B^{(-\gamma)} \tag{12}$$

where K is a constant and B is scene brightness.

Therefore, if the video signal $V_X$ is coupled to the input terminal $V_X$, the circuit of FIG. 1 may be used to provide negative gamma characteristics other than −1 by adjusting voltages $V_B$, $V_Z$ and P.

In a typical application, the gamma of a negative film is within the range of −0.35 to −0.65 from which it is desired to develop a signal for processing which has the proper positive gamma characteristic of +1. A correction of gamma to +1 for a negative film will most faithfully reproduce the original scene content, whereas in a positive film having a typical gamma of +2, the reproduction is faithful only as to the film image. Attempts to alter the positive gamma of positive film results in a loss of color saturation and is therefore rarely attempted. The ability to reproduce the original scene from negative film provides an improved image quality.

The operation of the circuit of FIG. 1 with a typical negative film having a gamma of −0.5 can be best described by reference to equation (4) which represents the transfer characteristic of the circuit of FIG. 1 and equation (12) which represents the light transmission of the film in terms of brightness as follows:

$$V_{OP} = \frac{V_Z \left(\frac{R_1}{R_1 + R_2}\right)}{(V_X + V_B)K_M \left(\frac{R_2}{R_1 + R_2}\right) - \frac{1}{K_A}} + P \tag{4}$$

Initial conditions for equation (4) are established by selection of values for $R_1$, $R_2$, $K_A$ and $K_M$. Satisfactory operation has been achieved with the following values:

$$\frac{R_1}{R_1 + R_2} = .1$$

$$\frac{R_2}{R_1 + R_2} = .9$$

$$K_A = 30$$

$$K_M = 1$$

therefore:

$$V_{OP} = \frac{V_Z(.1)}{(V_X + V_B) \cdot (.9) - \frac{1}{30}} + P \quad (13)$$

As previously stated, a properly shaped negative gamma output $V_{OP}$ in terms of $V_X$ may be achieved by adjustment of the values for $V_Z$, $V_B$, and P. Suitable values of $V_Z$, $V_B$, and P for a negative gamma film of $-0.5$ may be derived from equation (13) as follows: In equation (12):

$$V_X = K \cdot B^{-\gamma}$$

which relates video output $V_X$ to scene brightness. For a value $V_{OP} = 1$ at 100% scene brightness, equation (12) yields $V_X = K \cdot B^{-0.5} = .14142$ so that $V_X = 1$ at minimum scene brightness, which also determines the constant K as 0.14142.

Columns 1 and 2 of following Table A illustrates calculated values of $V_X$ for scene brightness B from 100% to 2%, whereas Column 3 shows actual measured values obtained from the circuit of FIG. 1.

TABLE A

| Column 1 | Column 2 | Column 3 |
|---|---|---|
| B | $V_X = .14142 \times B^{-.5}$ | $V_{OP}$ measured |
| 1.0 | .14142 | 1.000 |
| .7 | .16903 | .623 |
| .5 | .20000 | .432 |
| .35 | .23905 | .307 |
| .28 | .26726 | .251 |
| .2 | .31623 | .188 |
| .14 | .37796 | .140 |
| .1 | .44721 | .106 |
| .07 | .53452 | .0779 |
| .05 | .63246 | .0574 |
| .035 | .75593 | .0402 |
| .028 | .84515 | .0313 |
| .02 | 1.0000 | .020 |

Selecting values of $V_X$ for 100%, 14% and 2% scene brightness from Table A yields:

$V_X = 0.14142$
$V_X = 0.37796$
$V_X = 1.0000$ and the corresponding $V_{OP}$ signal desired will be:

$V_{OP} = 1$
$V_{OP} = 0.14$
$V_{OP}$ 32 0.02

Figure 3:
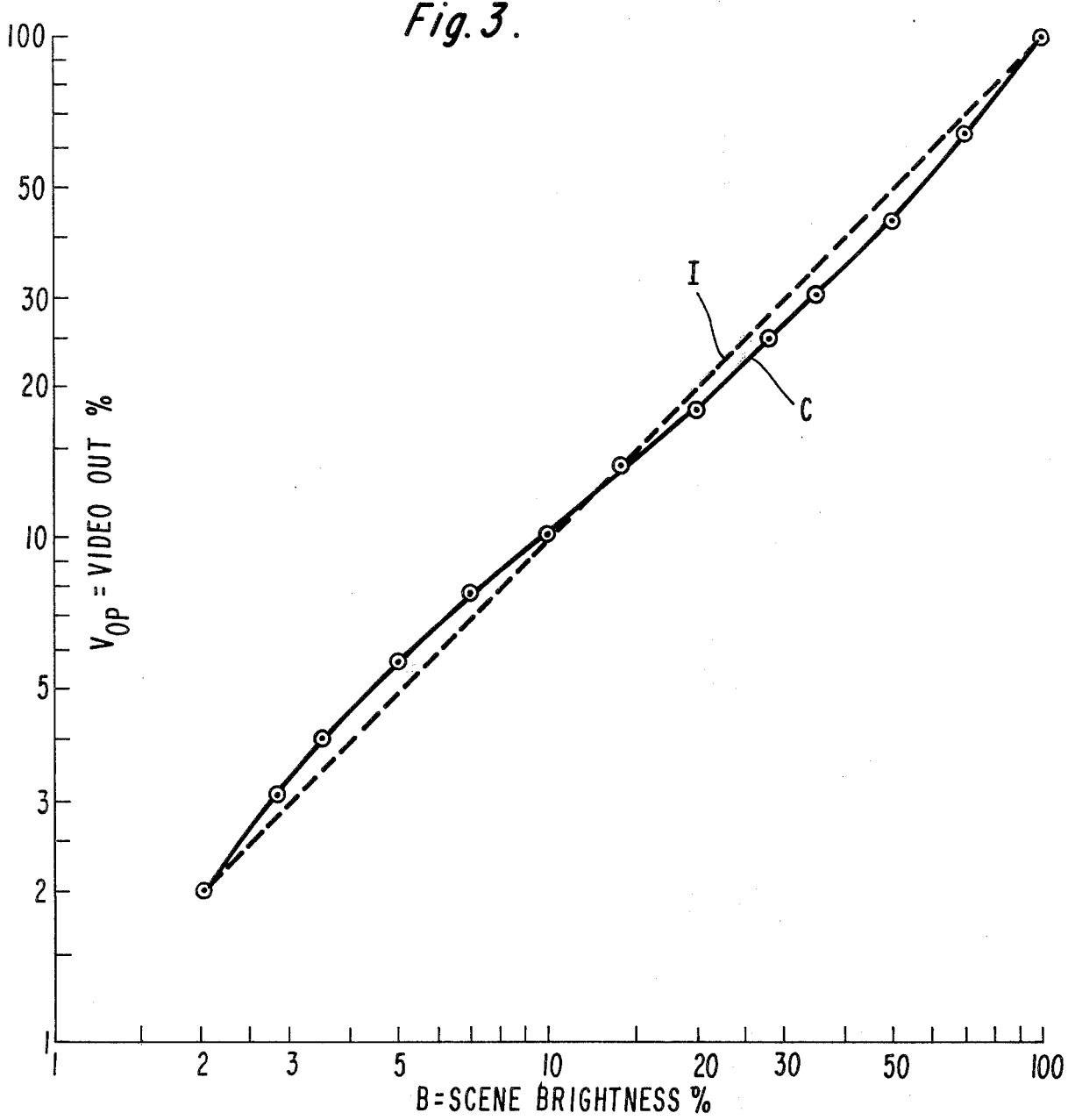
FIG. 3 illustrates typical characteristic curves of the circuits of FIGS. 1 and 2.

Substituting the values of $V_X$ corresponding to the desired light transmission of the negative film at 100%, 14%, and 2% in equation (13) results in three equations in which $V_Z$, $V_B$ and P are unknowns. Solving the three equations simultaneously results in values for $V_Z$, $V_B$ and P of:

$V_Z = +0.4482$
$V_B = -0.05627$
$P = 0.03493$ therefore:

$$V_{OP} = \frac{.4482(.1)}{(V_X - .05627) \cdot (.9) - \frac{1}{30}} - .03493 \quad (14)$$

which when solved for values of $V_X$, as shown in Columns 1 and 2 of Table A, results in an overall transfer characteristic approximating gamma equal to +1. The values of $V_{OP}$ versus brightness B are plotted and illustrated in FIG. 3 by curve I which represents an ideal power law. Curve C of FIG. 3 and previously mentioned Column 3 of Table A illustrate the actual transfer characteristic obtained in practice from the circuit of FIG. 1 utilizing the selected initial condition values.

Figure 2:
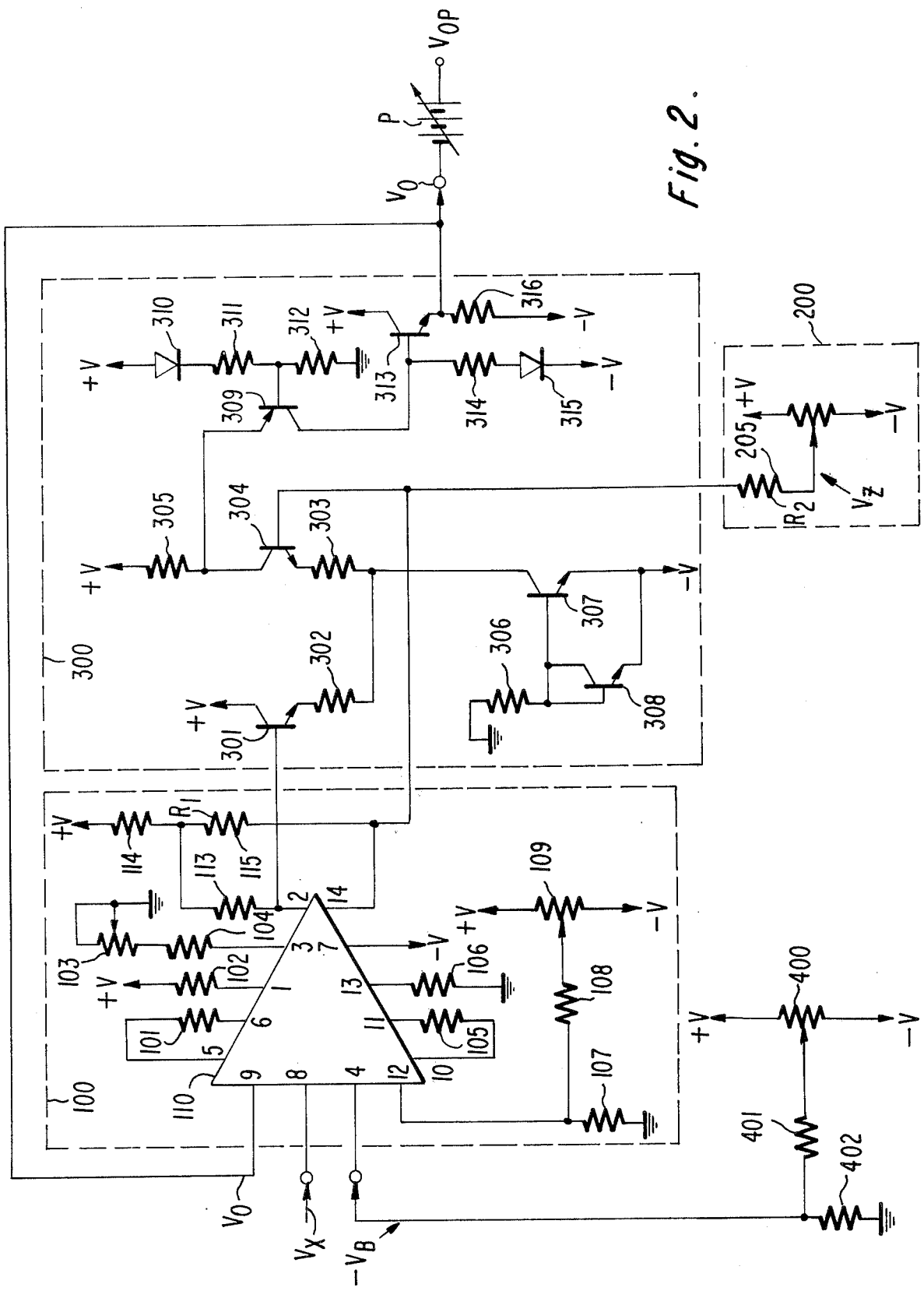
FIG. 2 is a more detailed schematic of the negative gamma circuit of FIG. 1.

FIG. 2 is a more detailed schematic circuit diagram of the negative gamma circuit of FIG. 1 in which functional groups of components have been identified with the same reference numerals used in FIG. 1.

Multiplier 110 is a four-quadrant multiplier in commercially available integrated circuit form, for example, the Motorola MC-1595L. Resistors 101, 102, 103, 104, 105,, 106, 107, 108, 109, 113, 114, and 115 are used to configure the multiplier 110 for a basic divide mode of operation in conjunction with operational amplifier 300. Transistors 301, 304, 309, 307, 308, 313 and the associated resistors 302, 303, 305, 311, 312, 314, 316, 306 form such an operational amplifier 300. Amplifier 300 further includes diodes 310 and 315 for providing temperature stability of amplifier 300.

An input signal $V_X$ is coupled to a first input circuit of multiplier 110 and a voltage $-V_B$ derived from voltage divider 400 is advantageously coupled to the signal inverting terminal of the same first input circuit, thereby adding $V_X$ to $V_B$ $(V_X + V_B)$. A second input circuit of multiplier 110 receives an input signal $V_O$ from the output terminal of amplifier 300 while the corresponding signal inverting terminal of the second multiplier input circuit is coupled to a reference voltage divider 109 to balance the first and second input circuits of multiplier 110. In this configuration, multiplier 110 provides a differential output signal at its output terminals (2, 14) comprising the product of the two input circuits of multiplier 110 in the form of $-V_O$ $(V_X + V_B)K_M$. $K_M$, the multiplier constant is determined by resistors 103 and 104. The input terminals comprising the respective base electrodes of transistors 301 and 304 of differential input amplifier 300 are coupled to output terminals 2 and 14 of multiplier 110 as shown. A voltage $V_Z$ derived from voltage divider 206 is coupled by resistors 205 and 115 ($R_2$ and $R_1$), respectively, for controlling the output level $V_O$ of amplifier 300. A voltage P is added in later circuitry (not shown) to provide the D.C. pedestal yielding on output $V_{OP}$.

As illustrated, the circuit of FIG. 2 satisfies the transfer characteristic of equations (4) and (13), thereby providing the desired negative gamma correction by adjustment of $V_Z$, $V_B$ and P.

As previously described in connection with a negative film of gamma equal to $-0.5$, similar computations may be made for any value of gamma within the range of $-0.35$ to $-1$; however, in practice, such computation is tedious; alternatively, changes in negative gamma may be readily accomplished by inserting a negative image of a standard gray scale, for example, EIA Logarithmic Gray Scale, and adjusting $V_Z$, $V_B$ and P while observing a television camera waveform monitor display.

What is claimed is:

1. A gamma circuit for developing a video output signal having a positive gamma coefficient from an input signal having a negative gamma coefficient, comprising:
   an input terminal for receiving a first signal ($V_X$), having a negative gamma coefficient;
   a first reference source ($V_B$);
   first combining means coupled to said first signal and to said first reference source for providing a first additive combination ($V_X + V_B$) of said first signal and said first reference source;
   a second reference source ($V_Z$);
   divider means responsive to said first additive combination signal and said second reference source for developing an output signal equal to said second reference source divided by said first additive combination signal;
   a third reference source (P);
   second combining means coupled to said divider output signal and said third reference source for additively combining said divider output signal and said third reference source.

2. A gamma circuit according to claim 1 wherein said divider means includes a multiplier coupled in feedback with an amplifier, said multiplier having first and second input circuits and an output circuit, said first additive combination signal being coupled to one of said multiplier input circuits, said multiplier output circuit being coupled to an input terminal of said amplifier, the output terminal of said amplifier being coupled to the other of said multiplier input circuit, said second reference source being coupled to said amplifier input terminal for developing from said divider means an output signal equal to said second reference source divided by said first additive combination signal.

3. A gamma circuit according to claim 2 wherein said first, second and third reference sources are variable D.C. voltages.

4. A gamma circuit according to claim 3 wherein said variable reference sources provide means for adjusting the gamma of said circuit to correct an input signal gamma of −0.35 to −1 to a positive gamma.

* * * * *

UNITED STATES PATENT OFFICE
CERTIFICATE OF CORRECTION

PATENT NO. : 4,018,988

DATED : 4/19/77

INVENTOR(S) : Harold George Seer, Jr.

It is certified that error appears in the above-identified patent and that said Letters Patent are hereby corrected as shown below:

Column 5, Line 58 - change "$V_{OP}$ 320.02" to -- $V_{OP} = 0.02$ -- .

Signed and Sealed this twenty-third Day of August 1977

[SEAL]

Attest:

RUTH C. MASON
Attesting Officer

C. MARSHALL DANN
Commissioner of Patents and Trademarks